March 14, 1972 W. A. OLSON 3,649,725
METHODS FOR ACCELERATING THE CURING OF CONCRETE
Filed Jan. 28, 1971 3 Sheets-Sheet 1

Inventor
Wallace A. Olson
By Drake and Crandall
Attorney

March 14, 1972 W. A. OLSON 3,649,725
METHODS FOR ACCELERATING THE CURING OF CONCRETE
Filed Jan. 28, 1971 3 Sheets-Sheet 2
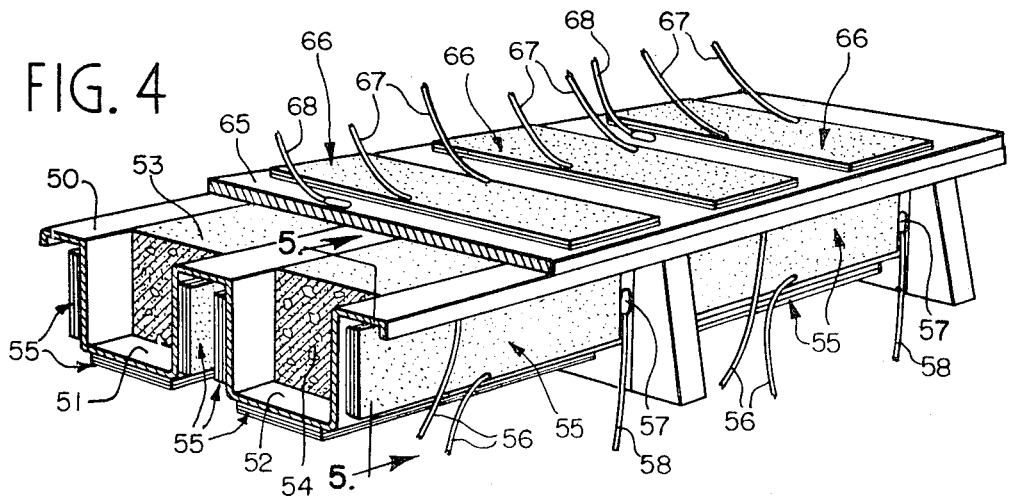
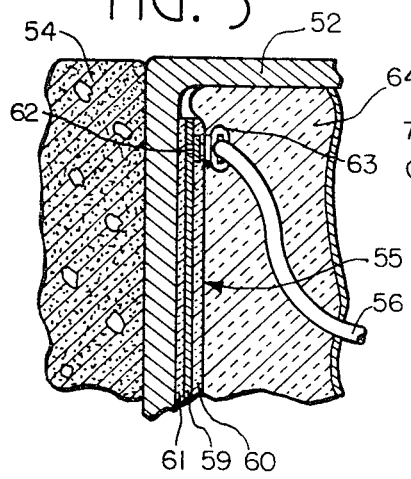
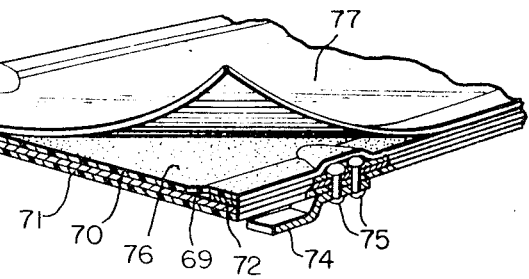
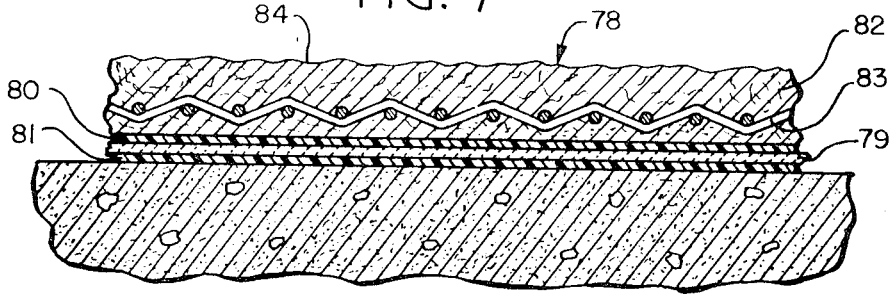
Inventor
Wallace A. Olson
By Drake and Crandell
Attorney March 14, 1972 W. A. OLSON 3,649,725
METHODS FOR ACCELERATING THE CURING OF CONCRETE
Filed Jan. 28, 1971 3 Sheets-Sheet 3
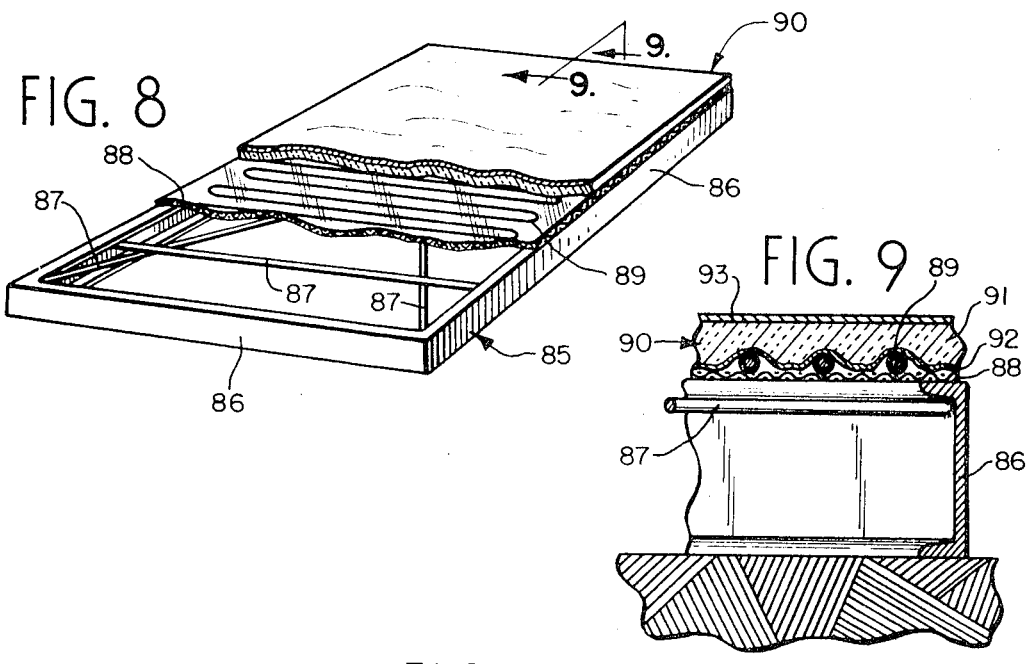
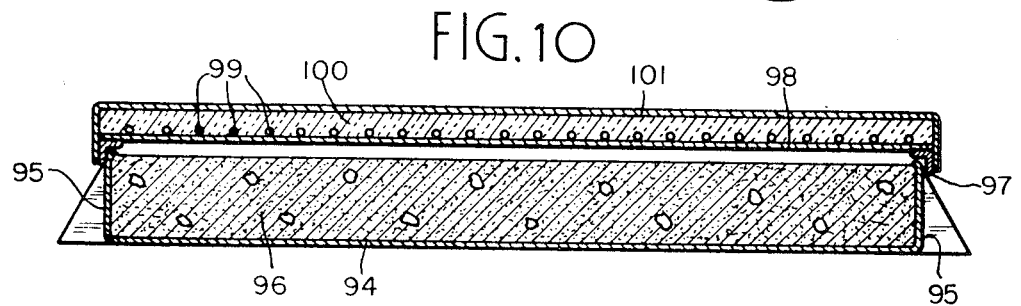
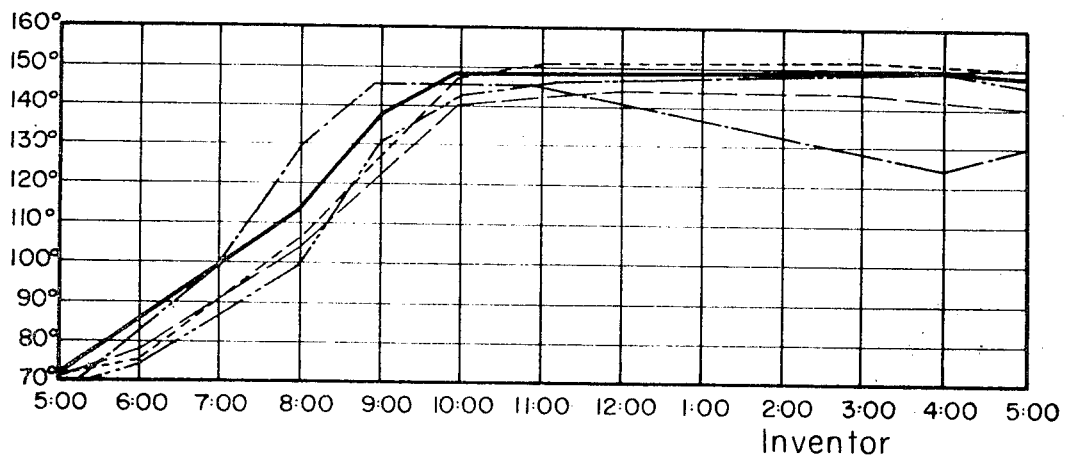
Inventor
Wallace A. Olson
By Drake and Crandell
Attorney United States Patent Office 3,649,725
Patented Mar. 14, 1972

3,649,725
METHODS FOR ACCELERATING THE CURING
OF CONCRETE
Wallace A. Olson, 500 S. Kiwanis Ave., Apt. 315,
Sioux Falls, S. Dak. 57105
Original application Oct. 24, 1968, Ser. No. 770,163.
Divided and this application Jan. 28, 1971, Ser.
No. 110,512
Int. Cl. B28b 21/78
U.S. Cl. 264—40                              4 Claims

ABSTRACT OF THE DISCLOSURE

To accelerate the curing of concrete, heat is applied to a fluid concrete mix substantially uniformly over the outer mix surface. The temperature of the mix is sensed and the application of the heat is terminated when that temperature reaches a predetermined level such that the immediately subsequent exothermic heating within the mix further increases its temperature only to a substantially predetermined maximum value that corresponds to substantially maximum subsequently-ultimate compressive strength of the concrete.

---

This application is a division of copending parent application Ser. No. 770,163, filed Oct. 24, 1968.

The present invention pertains to methods for accelerating in the curing on concrete. It also relates to methods for obtaining improved curing.

Numerous techniques have heretofore been employed in an effort to accelerate the curing or hardening of concrete. For example, electric current has been actually conducted through the mix itself, in some cases utilizing included re-enforcing bars as at least one of the electrodes. As another approach, hot water or steam has been conducted through tubing included in form structures for the purpose of hastening the curing process.

Accelerated curing of the concrete is particularly important from an economic standpoint in the fabrication of such large structural members as pre-stressed pilings, beams and other sections used in the construction of concrete bridges and the like. These elements typically are cast in giant forms that occupy substantial space and in themselves are very expensive. Absent accelerated curing, the concrete often must remain in the form for a period of perhaps seven days. Successful acceleration of the curing can permit removal of the concrete casting within twelve to forty-eight hours permitting a much greater volume of production from each form. Also in field construction, accelerated curing is more economical in that it permits form removal after a shorter time interval.

In addition to reducing the time required for curing, it is also desired, and indeed required, that the member exhibit a certain minimum compressive strength. That strength typically is specified on the basis of measurements of core samples taken at the end of the initial curing period, three, seven or twenty-eight days following the original pouring of the concrete mix. Some of the prior approaches to the acceleration of concrete have been deficient in that the ultimate compressive strength is too low. Other approaches have been excessively costly in terms of the apparatus necessary to implement them or the cost of the energy employed for the purpose of heating the mix. Difficulties have also been encountered by such effects upon the concrete as creep, shrinkage, camber, warpage, cracks, checks, alligatoring, surface dusting, discoloration, release from the forms and the like.

It is a general object of the present invention to provide new and improved methods for curing concrete that overcome or at least minimize the aforenoted deficiencies, inefficiencies and difficulties.

Another and particular object of the present invention is to provide methods for accelerating the curing of concrete in minimum time while at the same time maximizing ultimate compressive strength.

A method of accelerating concrete curing in accordance with the present invention includes the steps of depositing a fluid concrete mix in a form, applying heat substantially uniformly over at least one outer surface of the mix, sensing its temperature, and terminatnig the application of the heat when the temperature reaches a preselected level such that immediately subsequent exothermic heating within the mix further increases the temperature only to substantially a predetermined maximum value corresponding to substantially maximum subsequently-ultimate compressive strength of the concrete.

The features of the present invention which are believed to be novel are set forth with partciularly in the appended claims. The organization and manner of operation of the invention, together with further objects and advantages thereof, may best be understood by reference to the following description taken in connection with the accompanying drawings, in the several figures of which like reference numerals identify like elements, and in which:

FIG. 4 is a perspective view, partially broken away, of an embodiment alternative to that shown in FIG. 1;

FIG. 5 is a fragmentary cross-sectional view taken along the line 5—5 in FIG. 4;

FIG. 6 is a fragmentary perspective view showing a heating element of a kind utilized in the embodiment of FIG. 4;

FIG. 7 is a fragmentary cross-sectional view of still another embodiment of apparatus useful for accelerated curing;

FIG. 8 is a perspective view, partially broken away, of an electrically-energized heating apparatus;

FIG. 9 is a fragmentary cross-sectional view taken along the lines 9—9 in FIG. 8;

FIG. 10 is a cross-sectional view of a still different electrically-energized heating apparatus; and FIG. 11 is a plot of curves illustrating one manner of operating the structures depicted by the preceding figures.

Figure 1:
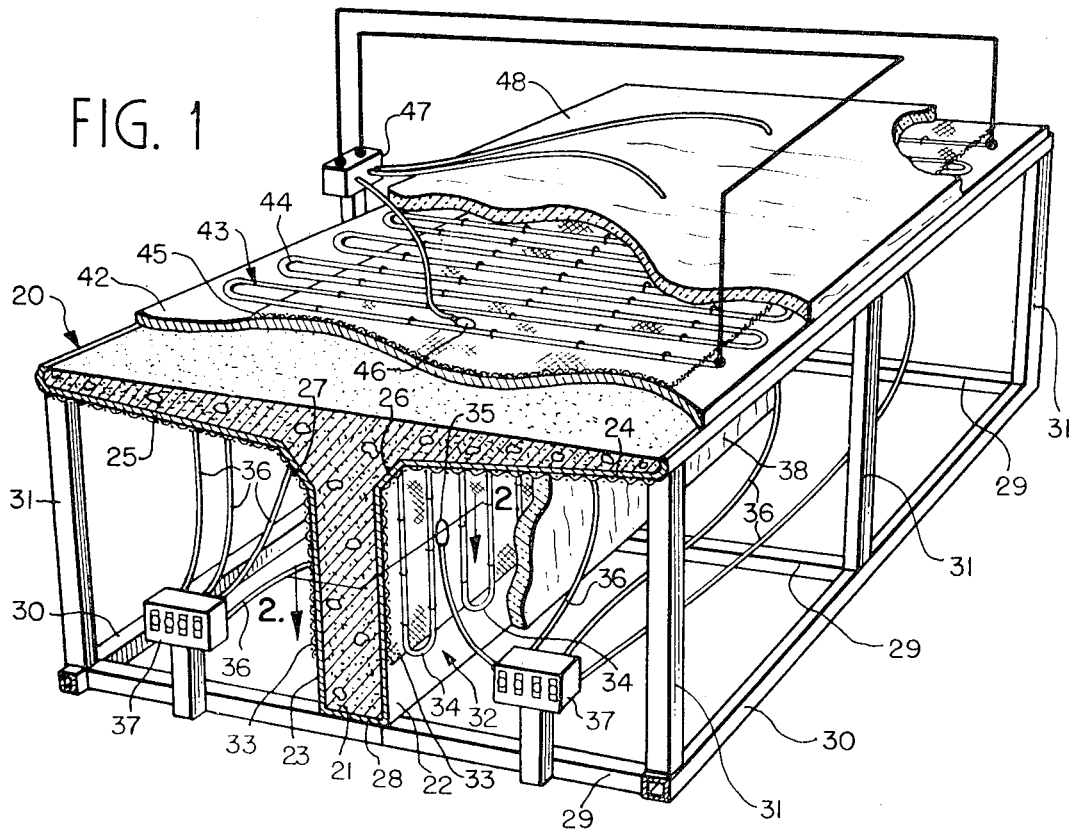
FIG. 1 is a perspective view, partially broken away, of a first embodiment of apparatus useful for accelerating the curing of concrete.

FIG. 1 illustrates a giant casting bed or form 20 utilized to mold a T-shaped casting 21 of pre-stressed concrete. The form includes spaced upright panels 22 and 23 that define the vertical member of the T and laterally projecting sections 24 and 25 that define the underside of the horizontal portions of the T. Moreover, sections 24 and 25 are turned upwardly at their outer ends so as to constitute side walls of the form for the horizontal T portion. Sections 24 and 25 are joined respectively to sections 22 and 23 by still additional slanted sections 26 and 27. A further section 28 is joined between the bottom edges of sections 22 and 23 to complete the form itself. Section 28 is disposed across a plurality of spaced horizontal beams 29 joined at their respective ends by additional beams 30 from which upwardly project studs 31 on the upper ends of which rest sections 24 or 25, as the case may be, on opposite sides of the overall apparatus. As such, casting forms having a cross-sectional shape as shown, as well as others having a wide variety of different shapes, are well-known in the pre-stressed concrete industry. Such forms have at times included fluid-carrying conduits formed into the structure of sections 22–28 in order to convey heat by means of steam or like in an effort to accelerate curing of the concrete mix placed into the form.

In FIG. 1, however, heating for the purpose of accelerating curing of the concrete is achieved by means of an electrically-energized element 32 disposed in substantially convective contact with the external surfaces of the form. Heating element 32 is itself fabricated so as to produce heat substantially uniformly over the form surface. To this end, heating element 32 includes a heat-conductive wire mesh 33 cemented or otherwise affixed directly to the exposed exterior surface of sections 22–28. A heat-producing electrically-conductive insulatingly-covered length of resistance wire 34 is folded back and forth across the surface of and affixed to mesh 33.

Also disposed at least substantially in convective contact with individually different ones of sections 22–28, as by being affixed directly to mesh 33 in the manner illustrated, are a plurality of temperature-sensing elements 35 distributed over the outer surface of the form in correspondence with separately-controlled units of resistance wire 34. Capillary tubes 36 extend individually from the respective different sensors 35 to thermostatic control units 37. The length of each separate unit of resistance wire 34 is selected in view of the supply source potential and available current capacity, its own heat dissipation per unit length and the desired heat output per unit of surface area. Depending upon the routine selection from among these different variables, physically-separate sections of the folded heating wire may be joined together in appropriate series or parallel combinations. However, each such unit is separately energized from a conventional power source, typically a 110 or 220 volt supply of 60 c.p.s. alternating current, by the actions of the individually different thermostatic controllers 37 in accordance with their different thermal settings and the respective different temperatures determined by sensors 35. To conserve energy, the side of resistance wire 34 opposite the form preferably is covered by a layer 38 of heat-insulating material such as asbestos.

Figure 2:
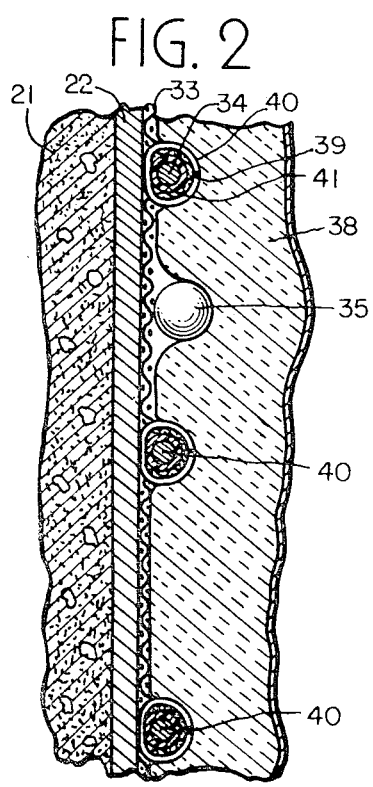
FIG. 2 is a fragmentary cross-sectional view taken along the line 2—2 in FIG. 1.
Figure 3:
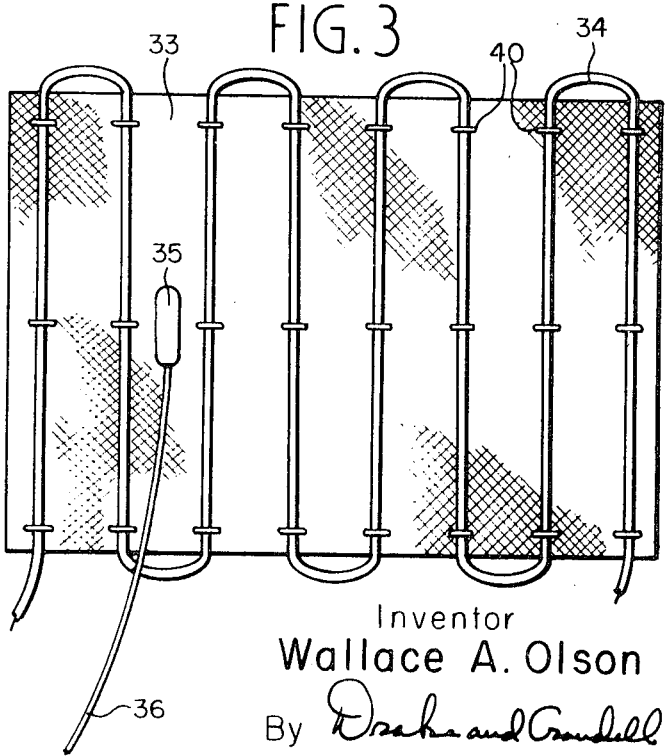
FIG. 3 is plan view of an electrically-energized heating element utilized in the apparatus of FIG. 1.

As shown in FIG. 1 for clarity of illustration, wire 34 is folded back and forth with a comparatively wide-spacing between the folds. In actual practice, the spacing between adjacent folds is preferably more narrow in order to obtain evener heating. In a typical example, the fold spacing is only about one and one-half inches. The wire, covered with a vinyl or other insulating sleeve, is in either solid or stranded form of a conductor such as copper typically of about sixteen gauge. The total length of each section is selected to achieve a dissipation of between ten and thirty-five, and preferably about the latter, watts per square foot of form area heated. Mesh 33 in this example is a section of ordinary window screen of about twenty-six gauge galvanized steel wire. The mesh is pressed into channels 39 as shown in FIG. 2. At spaced portions along the length of the wire, a metal staple 40 projects through the mesh and clips around insulation 41 covering the conductive wire, as depicted in FIGS. 2 and 3. The resulting construction serves admirably to insure dissipation of the heat into the concrete mix substantially uniformly over the entire heated area of the form.

Preferably covering the upper surface of mix 21 is a sheet 42 of moisture-impervious material in order to prevent evaporation to the atmosphere of water from the mix. Disposed on top of sheet 42 is another electrically-energized heating element 43 that in this case again is in the form of a resistance-wire conductor 44 folded back and forth across and affixed to a heat-conductive wire mesh 45. Temperature sensors 46 are distributed over mesh 45 in order to sense the temperature in the region of each different heater unit and supply a corresponding signal to a thermostatic controller 47 that controls the supply of energizing power to the heating element as indicated schematically in FIG. 1. Finally, a layer 48 of heat-insulating material is disposed to overlie conductor 44 and mesh 45. As shown, but a single energizing connection is provided between controller 47 and conductor 44; in practice, conductor 44 is segmented into a plurality of smaller units each individually controlled and energized in response to the respective different temperature sensors.

Because details in the manner of operating the FIG. 1 apparatus apply also to others of the structural embodiments to be discussed herein, those other structures will next be described after which attention will be directed to the operation. Looking then at the apparatus of FIG. 4, a form 50 is shaped to define a pair of adjacent U-shaped channels 51 and 52 in which concrete mix is placed to mold a corresponding pair of square beams 53 and 54. The exposed ends of beams 53 and 54 have been offset in FIG. 4 to more clearly depict the shape of the channels; in use, of course, an end plate encloses the ends of each of the channels and the mix completely fills the space bounded by the forms.

Secured against the exterior heat-conductive channel walls are a plurality of electrically-energized heating panels 55 each of which have power-connecting leads 56. Disposed in thermally-conductive contact with the channel wall adjacent to each panel 55 is a temperature sensing element 57 from which extends a capiillary tube 58 that, in the manenr of FIG. 1, leads to a thermostatic controller which controls the supply of power by way of leads 56 to panels 55.

The individual heating panels are composed of a layer 59 of electrically-conductive material such as carbon sandwiched between a pair of layers 6 and 61 of electrically-insulating material, such as asbestos, with at least layer 61, which is in convective contact with the wall of the thermally-conductive form material. being also substantially heat-conductive. Also included between layers 60 and 61 in electrical contact with spaced portions of layer 59 are electrically-conductive strips 62 to which individual different ones of each pair of leads 56 are respectively electrically coupled by connectors 63. The application of electric power by way of leads 56 effects the flow of current in conductive layer 59 and the resultant dissipation of heat therefrom by virtue of resistance heating. To conserve heat, external layer 60 preferably is covered with a sheet 64 of thermally-insulating material.

Covering the upper surface of the mix from which beams 53 and 54 are formed preferably is a moisture-impervious sheet 65 such as a plastic, metal foil or, conveniently for handling, a thin sheet of aluminum. A plurality of additional heating panels 66, formed in the same manner as panels 55, are distributed across sheet 65 with each panel 66 having its respective power-connecting leads 67. Similarly in this case, one or more temperature sensors 68 are in thermal contact with sheet 65 and serve through thermostatic controllers to control or regulate the supply of energizing power to panels 66.

A modified electrically-energized heating panel is shown in FIG. 6 wherein a layer 69 of electrically-conductive material is sandwiched between a pair of layers 70 and 71 that are preferably of plastic in order to be both highly flexible and moisture-impervious. By reason of the latter character of layers 70 or 71, the resulting heating panel may, for example in the case of covering and heating the exposed upper surface of the mix in the forms of either FIG. 1 or 4, be placed directly against the mix. Included between layers 71 and 70, running along opposed edges of the panel, are strips 72 and 73 of electrically-conductive material that are in contact with conductive layer 69 so as to serve as spaced electrodes for conducting current through the conductive layer. To that end, connector terminals 74 are secured by rivets 75 to strips 72 and 73 respectively. Instead of an actual sandwich formation, the electrically-conductive material in the devices of either FIGS. 6 and 7 may be directly impregnated in and distributed throughout a carrier material such as a plastic.

Another suitable insulating material is fiberglass or so-called glass cloth.

To facilitate quick and simple attachment of the heating panels to the walls of the form, the external surface of layer 70 in this instance is coated with a contact-type adhesive 76. For ease of handling the panel prior to installation, adhesive layer 76 is covered with a thin sheet 77 of a protective material such as paper. To apply the panel to a surface of the form, the installer merely peels off layer 77 and presses the panel directly against the wall of the form whereupon adhesive 76 holds it in place. In this way, defective panels may be quickly substituted and, after use with temporary forms such as those often set up in field construction, the panels may be removed for subsequent use elsewhere. The flexibility of layers 69–71 together with the use of adhesive 76 permits attachment of the panels to form surfaces of irregular shapes.

For particular use directly upon exposed concrete mix surfaces, such as over the top of the mix placed into the forms of FIGS. 1 and 4 or on the upper surface of concrete slabs in the case of pavement or sidewalk construction, the heating unit of FIG. 7 is in the form of a lightweight flexible blanket 78. Like in the case of FIG. 6, the underside of blanket 78 includes an electrically-conductive layer 79 of a material such as graphite across spaced portions of which electrically-conduictive power-connecting strips (not shown) are connected. Conductive layer 79 is sandwiched between a pair of layers 80 and 81 with at least layer 81 being both heat-conductive and moisture-impervious. For simplicity of fabrication, both layers 80 and 81 are in this case formed of plastic. Secured to and disposed over the surface of upper layer 80 is a sheet 82 of heat-insulative material preferably composed of foam vinyl or other resilient substance. Imparting strength to blanket 78 against tearing of sheet 82 is a preferably included web 83 of re-enforcing material formed by interlaced strings of a tough material such as nylon. For purposes to be further discussed hereinafter, at least the upper, exposed surface 84 of sheet 82 is a bright color, such as white or yellow, in order to be highly reflective to light or electromagnetic waves in the visible portion of the spectrum. At the same time, preferably, both layers 80 and 81, as well as conductive layer 79 when composed of graphite, are of a black color in order to be highly reflective of electromagnetic radiation in the ultra-violet and near-ultraviolet regions of the spectrum.

To enable placement over a generally-flat and horizontal surface to be heated, the apparatus of FIG. 8 includes a hollow, rectangular frame 85 composed of channels 86 secured together and preferably formed of a light-weight material such as aluminum. Diagonally opposite corners of frame 85 and oppositely spaced other portions of the frame are interconnected by struts 87 in order to give rigidity to the unit. The resulting frame thus has its major dimensions horizontal and its sidewalls define both an open top and an open bottom.

Disposed between those sidewalls across the open top is a layer 88 of heat-conductive material. In this case, layer 88 is a wire mesh of the kind shown and described with respect to FIG. 3 secured around its periphery to the upper surface of channels 86. Similarly, an electrically-conductive resistance wire 89 having an electrically-insulative covering is distributed across the surface of mesh 88 by being folded back and forth and pressed into channels formed in the mesh. Located so as to overlie mesh 88 and conductor 89 is a sheet 90 of heat-insulating material, in this case a sheet of conventional building insulation having an insulating filler 91 and an aluminum-foil backing 92 which is placed directly over the heating wire 89. Disposed across the upper or outer surface of filler 91 is a thin sheet 93 preferably again of a light-weight material such as aluminum. Sheet 93 thus also is moisture-impervious so as to shield against the effects of precipitation in an outdoor environment.

In use, the FIG. 8 unit may be placed directly over a horizontally-disposed quantity of concrete mix such as exists in the case of the formation of a slab. In this case, the actual heating unit, composed of mesh 88 and resistance wire 89, is spaced by the width of channels 86 from the mix. This is particularly advantageous in certain field applications wherein the concrete mix includes an extremely course aggregate such as stones of considerable size. In that situation, a stone near the upper surface of the mix can act to concentrate and reflect back into the heating element an intense quantity of heat, in some cases sufficient to scorch or even destroy a section of the heating element when the latter is placed directly upon the mix surface. That result is avoided with the FIG. 8 apparatus by virtue of the fact that the heating element is spaced a short distance away from the upper mix surface and thus is not in direct thermal contact therewith.

An auxillary use for the FIG. 8 apparatus is particularly valuable during conditions of freezing weather. With the ground frozen, it is, of course, difficult to dig into the earth in order, for example, to excavate the earth in preparation for pouring a concrete slab. However, simply by placing the FIG. 8 apparatus over the region to be excavated and energizing resistance wire 89, sufficient heat is dissipated into the ground comparatively quickly to thaw the earth even to a depth of several feet. In a typical practical embodiment for that purpose, the sizing and layout of resistance wire 89 is chosen so as to dissipate approximately seventy to one-hundred watts per square foot. As compared with laying a blanket such as that shown in FIG. 7 directly upon the ground, the apparatus of FIG. 8 also is advantageous when used for ground thawing, again because channels 86 space the heating element a short distance above the ground so that large rocks or other objects on or near the earth's surface cannot concentrate and reflect back sufficient heat to damage the heating unit. In use of this apparatus for thawing the ground, it is also advantageous in that the thawing occurs with a dispersal of the moisture that is unfrozen. This contrasts with the use of steam for ground thawing which results in the earth becoming muddy.

FIG. 10 illustrates a heating unit generally similar in shape to that of FIG. 8 and particularly adapted for the curing of concrete slabs molded in a horizontally-disposed form 94 having its major dimensions horizontal and its sidewalls 95 defining an open top. In at least most cases involving the formation of a slab whose thickness is small compared with its length and width, sufficiently uniform accelerated curing may be effected by heating only the exposed upper surface of the mix, as in the case of mix 96 in FIG. 10. To this end, the heating unit includes a rectangular frame 97 in this case formed of angle iron shaped to mount upon the upper periphery of side walls 95. Stretched horizontally across the frame so as to overlie the upper surface of mix 96, across the open top of form 94, is a layer 98 of a heat-conductive material such as a sheet of aluminum. An electrically-energized heating element is disposed substantially in convective contact with layer 98, and in order to produce heat substantially uniformly over this surface the element is again composed of a length or lengths of resistance wire 99 folded back and forth so as to be distributed over layer 98. Overlying heating element 99 is a layer 100 of heat-insulative material. To strengthen the entire assembly as well as to permit rougher handling, layer 100 preferably is covered by a sheet 101 of a material such as aluminum the outer edge portions of which are bent downwardly and secured to frame 97.

Turning now to the mode and manner of operation of the various different apparatus described above, it is helpful first to consider certain background material. The binding material utilized in the formation of concrete is commonly called cement. The concrete itself is the resulting hard mass that is formed from a mixture of cement, certain additives, an aggregate and water. The aggregate constitutes a filler and typically consists of various different proportions of sand, gravel and stone. The additives may include air entraining compounds and materials that are intended to produce better or quicker initial setting of the mix. A typical mix is composed of ninety-four pounds cement, one hundred sixty-nine pounds of moist sand, three hundred thirty-six pounds of moist gravel and four and one-half gallons of water. In general, most building construction involves the use of five to seven ninety-pound sacks of cement for each cubic yard of aggregate.

The cement itself is manufactured by driving out the moisture from natural chemical compounds in a high temperature kiln. Such compounds are composed primarily of lime, silica, certain clays and alumina. The resulting mass derived from the kiln is a solid clinker that subsequently is ground and screened to provide a powdery material. In driving out the moisture from the natural chemical by the use of heat, the chemical and physical change in the natural material involves the absorportion of energy by the material. The molecular structure is significantly changed so as to no longer have a link of water; it is dehydrated. Thus, the resulting cement, even though in powder form, retains latent energy. When this energy subsequently is released, as water is added to the mix, the reaction is exothermic so that the mix gives up heat. That is, water is taken back into the cement mixture as a hydration reaction so as again to become an integral molecular part of the cement as a result of which a binding material is created. The energy given off during the hydrating chemical reaction is sometimes termed the heat of hydration.

To obtain proper compressive strength in freshly mixed and placed concrete, it is necessary that moisture be retained in the concrete in a sufficient amount during its curing to allow complete chemical reaction (hydration) between the water and the cement to take place. Thus, one of the purposes of placing moisture-impermeable sheet 42 in FIG. 1 over the upper surface of the mix is to protect the as-yet-unformed upper surface from loss of moisture. When, instead, moisture is lost from a mix by reason of improper bedding under the mix, capillary attraction to the forms or covers or evaporation to the atmosphere as in the case where heated air is passed over the surface in attempted accelerated curing, the desired chemical balance in the ultimate concrete is upset. As a result, cracks and other undesirable surface blemishes typically appear.

In the usual concrete mix, more than a sufficient amount of moisture is included initially to properly complete the hydration process. However, when the care indicated is not taken to retain the moisture in the concrete so that the hydrating action is not permitted to become complete, the internal structure of the resulting concrete is disrupted as a result of which it exhibits insufficient compressive strength. Another concern in the placing of concrete arises during cold weather. When the temperature of fresh concrete is low, as may occur in cold weather, the initial setting is delayed as a result of which the mix may freeze so that proper hydration cannot take place. Even when initially set but not yet well cured, exposure of the mix to a freezing atmosphere while the compressive strength is still low may result in rupture of the internal structure. Consequently, the different heating apparatus described not only is advantageous from the standpoint of accelerating curing but also in permitting the pouring and formation of concrete structures during cold weather. This is especially significant in the case of huge forms such as that illustrated in FIG. 1; by permitting year-round operation even though located outdoors, the return from the investment in the form is, of course, substantially increased.

A different effect, most likely to occur in the summer, can also cause disruption of the internal structure of the concrete. The natural hydration action can be undesirably disturbed by the addition of excessive heat, particularly when the excess persists for a period of several hours. This disturbance may be encountered as a result of direct rays emanated by the sun. The damaging rays include both those in the visible portion of the spectrum and those in the ultraviolet and near ultraviolet regions. The consequence of permitting sun rays to strike the concrete in an excessive amount is to effect a regression of compressive strength gain during the curing period with a consequent loss in ultimate compressive strength. This, of course, can be troublesome with regard to forms such as those in FIGS. 1 and 4 that, because of their large size, often are located in the open. The trouble is also encountered necessarily in the pouring-in-place of concrete slabs during the construction of highways and sidewalks.

It is, then, to the end of avoiding such difficulty as a result of the direct rays of the sun that, in FIG. 7, sheet 82 of blanket 78 is colored so as to reflect the visible light waves and layers 80 and 81 are formed of a black-colored plastic so as to inhibit penetration of the ultraviolet and near ultraviolet rays. The use of blanket 78 may serve several purposes at the same time, particularly in some climates such as those at high altitudes where the daytime hours may be featured by comparatively high temperatures with bright sunlight while during the immediately-following night the temperature drops to a value below freezing. That is, blanket 78 forms a moisture-impervious seal over the concrete surface in order to prevent escape of the necessary water of hydration, its heating element when energized functions to prevent freezing of the curing mix and to accelerate curing and, at the same time, the reflective features of the blanket prevent overheating by sun radiation.

Generally speaking, the hydration process which is an essential part of hardening or curing of the concrete continues at a significant rate for a number of days. As related to unaccelerated curing at normal ambient temperatures, the compressive strengths of the concrete typically are measured and rated in terms of the strength at fixed intervals of time such as at three days, seven days and twenty-eight days following the time of pouring A reasonably-high ultimate compressive strength would be a value over six thousand pounds per square inch.

As indicated, the overall aim of accelerating the curing of concrete is to cause the concrete to reach at least near its ultimate compressive strength in a shorter period of time, and it is to that end that an external heat source is employed to apply heat to the mix. The function of the heat is to cause the water to be hydrated into the cement more quickly as a result of which what conventionally would be termed three, seven or twenty-eight days compressive strengths are obtained in a fraction of that time. It is believed that greater hydration of the water results during accelerated curing. The consequent formation of a greater bulk of cement paste, in turn, forms a less thick coat around each aggregate particle, and this accounts for the greater compressive strengths exhibited in the end.

However, an attempt to obtain even greater acceleration of the curing, by dissipating very large quantities of heat into the mix in order to greatly elevate its temperature, leads to an actual regression in compressive strength. In order to avoid the occurrence of such regression while at the same time obtaining maximum possible compressive strength in the minimum time interval, the manner in which the heat is applied is carefully controlled. This is the primary function of the temperature sensors and thermostatic controllers described above. Optimum results are obtained by first applying the heat substantially uniformly over the outer surface of the mix and then terminating application of the heat when the measured temperature reaches a preselected level. That level is such that the immediately subsequent exothermic heating, which continues within the mix, further increased the mix temperature only to a predetermined maximum value. That maximum value corresponds to the attainment of maximum ultimate compressive strength at the end of the curing period. Thus, the application of the heat is terminated earlier than might otherwise be the case when a temperature level is reached that anticipates the subsequent further exothermic heat rise so that the ultimate temperature the mix reaches is that most consistent with obtaining the highest compressive strength in the end.

While the ultimate compressive strength of concrete varies with respect to cements obtained in different geographical sections of the country, and even to some extent in the output from a single cement plant, the maximum value to which the mix temperature is caused and permitted to rise, including the increase due to exothermic reaction continuing after terminating the heating step, is found to be generally between 150° and 160°. In order to anticipate the subsequent exothermic temperature rise, it is also found that the application of heat from the external source must be terminated when the temperature rises to a level of about 140°. In addition, it is found preferable to include what may be termed a pre-setting period before heat from the electrically-energized heating element is applied. That is, the application of the heat is delayed until the initially-fluid mix reaches the semi-fluid condition typified as that when the exposed surface may first be meaningfully smoothed by trowelling. Additionally, the form may be pre-heated where necessary so that its temperature initially is approximately the same as that of the mix.

A typical time-temperature plot of such a heat cycle appears in FIG. 11 for the accelerated curing of concrete formed in a giant-T casting bed similar to the apparatus of FIG. 1. The same bed also included originally-installed duct work that had been utilized for the purpose of conveying steam in an effort to accelerate the curing. The four curves grouped rather closely together represent temperatures as measured in individually different sections along the length of the form. The other curve, that which appears to depart from the norm and is the lowest at the four o'clock position, indicates a measurement taken on a vertical test cylinder. Its lesser mass permitted a small loss of the heat of hydration as a result of which its temperature was slightly reduced after deenergization of the heating element.

A type II cement was utilized in the mix that was placed into the casting bed at a mix temperature of 70° F. The ambient temperature of the atmosphere surrounding the bed at the time of placement was 50° F. For the first two hours after placement, no external heat was applied from any of the heating elements. After that two-hour period, at 5:00 p.m., the heating elements were fully energized so as to dissipate heat at a rate of approximately thirty-five watts per square foot. After approximately four and one-half hours, at 9:30 p.m., the mix temperature reached an average value of about 140° F. as a result of which the thermostatic controls automatically de-energized the heating elements. However, the subsequent exothermic heating as a result of the continuing hydration process caused the temperature to continue to rise to a level of approximately 150° at which the temperature remained on through the night. It appears that the described electric curing results in a phenomena within the mix that produces a continuation of the exothermic reaction throughout a complete initial curing cycle that continues long after de-energization of the heating elements.

A core sample taken at the end of the initial curing period shown, at 5:00 a.m. the next morning, exhibited a compressive strength of forty-two-hundred pounds per square inch. This compared favorably with a core sample that previously had been taken after the same time interval from a mix the curing of which was accelerated by utilizing the steam conduits affixed to the mold. That sample had yielded a compressive strength of only 3500 pounds per square inch. Repeated tests of core samples, taken at the end of twenty-eight days following the initial accelerated curing according to the schedule shown in FIG. 11, resulted in the attainment of compressive strengths consistently about eight-hundred pounds per square inch above that which previously were regularly obtained by the use of steam curing in the same forming apparatus.

In other comparative tests, application of the heat in the manner of and according to the schedule herein described has resulted in concrete that, after only 72 hours, exhibited a compressive strength six-hundred pounds per square inch greater than the strength exhibited by concrete cured for seven days in accordance with so-called standard laboratory curing. That is, a form that previously might have been able to turn out but one casting per week may, by use of the principles herein discussed, have its production increased to two or three castings per week. Such increased productivity results in lower curing cost, and the close control of the curing as a result of the measured application of the heat results in more uniform high compressive strengths in successively produced castings.

The illustrated apparatus may take many different shapes and forms in correspondence with the production of a wide variety of differently-shaped concrete structures. While steel forms have been illustrated in FIGS. 1 and 4 as are typical to hold the heavy weights of concrete mix involved, other materials may be more advantageous for use in field construction. Wood, appropriately treated to reduce capillary attraction to the moisture in the mix, is a typical form material which is heat conductive. Another advantageous material is fiberglass in which case the heating-element resistance wire conveniently may be imbedded directly therein. In addition to forming structural members as have herein been illustrated, the techniques are equally applicable to the formation of complete structures such as concrete cattle-feeding bunkers.

Although the use of integral sheets of insulation have been particularly illustrated for the purpose of minimizing heat loss from the side of the heating element opposite the concrete mix, such insulation may be formed in any convenient manner. For example, after affixing the heating panels, such as those in FIG. 6, directly against a form wall, insulation then may be simply sprayed into place over the heating panels. This is particularly advantageous, for example, when affixing the panels to various steel form sections in the fabrication of vertical building walls and wherein the panels are of a variety of sizes and contours.

Numerous features of the present invention are claimed in the aforementioned parent application. Other such features are claimed in copending applications Ser. No. 106,784, filed Jan. 15, 1971, and Ser. No. 106,798, filed Jan. 15, 1971, which also are divisions of the parent application.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. The method of accelerating the curing of concrete which comprises the steps of:
    depositing a fluid concrete mix in a form;
    applying heat substantially uniformly over at least one outer surface of said mix;
    sensing the temperature of said mix;
    and terminating the said application of heat when the value of said temperature reaches a preselected level of approximately 140° F. such that immediately subsequent exothermic heating within said mix further increases said temperature only a predetermined maximum value of substantially between 150° and 160° F. corresponding to substantially maximum subsequently-ultimate compressive strength of said concrete.

2. A method as defined in claim 1 in which the application of said heat is delayed for a preselected time interval corresponding in said mix to reaching a condition of semi-fluidity.

3. A method as defined in claim 1 which further includes the step of preheating said form, prior to depositing said mix, to a temperature approximately the same as that of said mix upon disposition.

4. A method as defined in claim 1 which includes the step of preventing moisture from escaping from exposed surface area of said concrete mix.

References Cited

UNITED STATES PATENTS 3,510,547    5/1970    Eisler _____ 264—316 X

OTHER REFERENCES

"Compositions and Properties of Concrete" by Troxell, G. E. and H. E. Davis, 1956, McGraw-Hill Book Co., Inc., pp. 154–155.

ROBERT F. WHITE, Primary Examiner

T. P. PAVELKO, Assistant Examiner

U.S. Cl. X.R.

264—333, Digest 43